(12) United States Patent
Narita et al.

(10) Patent No.: US 12,432,448 B2
(45) Date of Patent: Sep. 30, 2025

(54) IMAGE BLUR CORRECTION APPARATUS, CONTROL METHOD THEREFOR, IMAGING APPARATUS, AND STORAGE MEDIUM

(71) Applicant: CANON KABUSHIKI KAISHA, Tokyo (JP)

(72) Inventors: Yu Narita, Kanagawa (JP); Ryuichiro Yasuda, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 328 days.

(21) Appl. No.: 18/151,018

(22) Filed: Jan. 6, 2023

(65) Prior Publication Data

US 2023/0232102 A1  Jul. 20, 2023

(30) Foreign Application Priority Data

Jan. 14, 2022 (JP) .................. 2022-004591
Dec. 9, 2022 (JP) .................. 2022-197365

(51) Int. Cl.
 *H04N 23/68* (2023.01)
 *G06T 7/20* (2017.01)
 *G06T 7/70* (2017.01)

(52) U.S. Cl.
 CPC ............ *H04N 23/682* (2023.01); *G06T 7/20* (2013.01); *G06T 7/70* (2017.01); *G06T 2207/30201* (2013.01)

(58) Field of Classification Search
 CPC ............... H04N 23/683; H04N 23/687; H04N 23/6812; H04N 23/682; H04N 5/23261; H04N 5/23296; H04N 5/23267; G06T 2207/20201; G06T 5/73; G06T 2207/30201; G06T 7/70; G06T 7/20
 See application file for complete search history.

(56) References Cited

U.S. PATENT DOCUMENTS

2017/0163894 A1* 6/2017 Wakamatsu ....... H04N 23/6812

FOREIGN PATENT DOCUMENTS

JP          5771461 A    9/2015
JP    2017-111430 A    6/2017

OTHER PUBLICATIONS

British Search Report issued on Jul. 21, 2023, that issued in the corresponding British Patent Application No. 2300401.3

* cited by examiner

*Primary Examiner* — Xi Wang
(74) *Attorney, Agent, or Firm* — Cowan, Liebowitz & Latman, P.C.

(57) ABSTRACT

An image blur correction apparatus comprises an object detection unit configured to output a position of the part of the object, a selection unit configured to select a part of an object from among parts of one or more objects, and an object blur correction amount calculation unit configured to calculate an object blur correction amount, wherein the object blur correction amount calculation unit, when a part of an object selected by the selection unit is switched from a first part to a second part, calculates the object blur correction amount based on a difference between a position of the selected part of the object and the target position, a position of the second part in an image, and a position of the first part in an image acquired before switching.

16 Claims, 7 Drawing Sheets

IMAGE BLUR CORRECTION APPARATUS, CONTROL METHOD THEREFOR, IMAGING APPARATUS, AND STORAGE MEDIUM

BACKGROUND OF THE INVENTION

Field of the Invention

The present invention relates to an image blur correction technique in an imaging apparatus such as a digital camera or a digital video camera.

Description of the Related Art

An imaging apparatus such as a digital camera corrects "object blur" caused by a change in a position of an object such as a person, in addition to "image blur" caused by camera shake of a user who holds a camera body.

The "image blur" due to camera shake can be detected using an angular velocity sensor attached to the imaging apparatus or by acquiring a motion vector of a stationary object (background) in a captured image. On the other hand, the "object blur" can be detected by performing object detection and measuring the position of the object.

In the object detection, it is also possible to detect each part (for example, a head, a face, a pupil, a nose, a mouth, a trunk, an arm, a leg, and the like) of the object. Depending on the imaging situation, a certain part of the object can be detected, but another part cannot be detected in some cases. For example, such cases include a case of an object present far away whose face is too small to detect but whose trunk is large enough to detect. Meanwhile, there are cases where the face can be detected from the skin color, but the trunk cannot be detected because the color of clothes blends in with the background. Thus, the part of the object that can be detected sometimes changes depending on the imaging situation.

Therefore, for example, Japanese Patent No. 5771461 discloses a technique for tracking an object by switching to detect a part other than the face if the face cannot be detected.

In Japanese Patent No. 5771461, only the position of the object is tracked but object blur correction that brings the position of the object closer to a predetermined target position in the image is not taken into consideration.

In the object blur correction, control is performed so that the position of a part of the object stably stays in the vicinity of a predetermined position in the image. At that time, when the position of the part of the object to be detected is switched, the difference in the position of the part before and after the switching is reflected in the control, and the position of the object sometimes changes in a screen even though the object is not moving.

For example, in a case where control is performed such that the face of a person remains at the center of the image, it is considered that the face cannot be detected in the middle and switching is performed such that the trunk is detected. In this case, there is a problem that a state in which the face is positioned at the center changes to a state in which the trunk is positioned at the center of the image, positions of parts of the face and the trunk unnaturally change, and the quality of the image is impaired.

SUMMARY OF THE INVENTION

The present invention has been made in view of the above-described problem, and provides an image blur correction apparatus that can perform object blur correction without impairing the quality of an image even when a part of an object to be detected is switched.

According to a first aspect of the present invention, there is provided an image blur correction apparatus comprising: at least one processor or circuit configured to function as: an object detection unit configured to detect an object for each part from an input image and output a position of the part of the object detected; a selection unit configured to select a part of an object from among parts of one or more objects detected by the object detection unit; and an object blur correction amount calculation unit configured to calculate an object blur correction amount for correcting object blur based on a difference between a position of a part of an object selected by the selection unit and a predetermined target position in an image, wherein the object blur correction amount calculation unit, when a part of an object selected by the selection unit is switched from a first part to a second part, calculates the object blur correction amount based on a difference between a position of the selected part of the object and the target position, a position of the second part in an image, and a position of the first part in an image acquired before switching.

According to a second aspect of the present invention, there is provided an image blur correction apparatus comprising: at least one processor or circuit configured to function as: an object detection unit configured to detect an object for each part from an input image and output a position of the part of the object detected; a selection unit configured to select a part of an object from among parts of one or more objects detected by the object detection unit; and an object blur correction amount calculation unit configured to calculate an object blur correction amount for correcting object blur based on a difference between a position of a part of an object selected by the selection unit and a predetermined target position in an image, wherein when a part of an object selected by the selection unit is switched from a first part to a second part, the target position is changed based on a position of a second part.

According to a third aspect of the present invention, there is provided an imaging apparatus comprising: an imaging device configured to image an object; and the image blur correction apparatus described above.

According to a fourth aspect of the present invention, there is provided a control method for an image blur correction apparatus, the method comprising: detecting an object for each part from an input image and outputting a position of the part of the object detected; selecting a part of an object from among parts of one or more objects detected in the detecting; and calculating an object blur correction amount for correcting object blur based on a difference between a position of a part of an object selected in the selecting and a predetermined target position in an image, wherein when a part of an object selected in the selecting is switched from a first part to a second part, in the calculating, the object blur correction amount is calculated based on a difference between a position of the selected part of the object and the target position, a position of the second part in an image, and a position of the first part in an image acquired before switching.

According to a fifth aspect of the present invention, there is provided a control method for an image blur correction apparatus, the method comprising: detecting an object for each part from an input image and outputting a position of the part of the object detected; selecting a part of an object from among parts of one or more objects detected in the detecting; and calculating an object blur correction amount for correcting object blur based on a difference between a position of a part of an object selected in the selecting and a predetermined target position in an image, wherein when a part of an object selected in the selecting is switched from a first part to a second part, the target position is changed based on a position of a second part.

Further features of the present invention will become apparent from the following description of exemplary embodiments with reference to the attached drawings.

DESCRIPTION OF THE EMBODIMENTS

Figure 1:
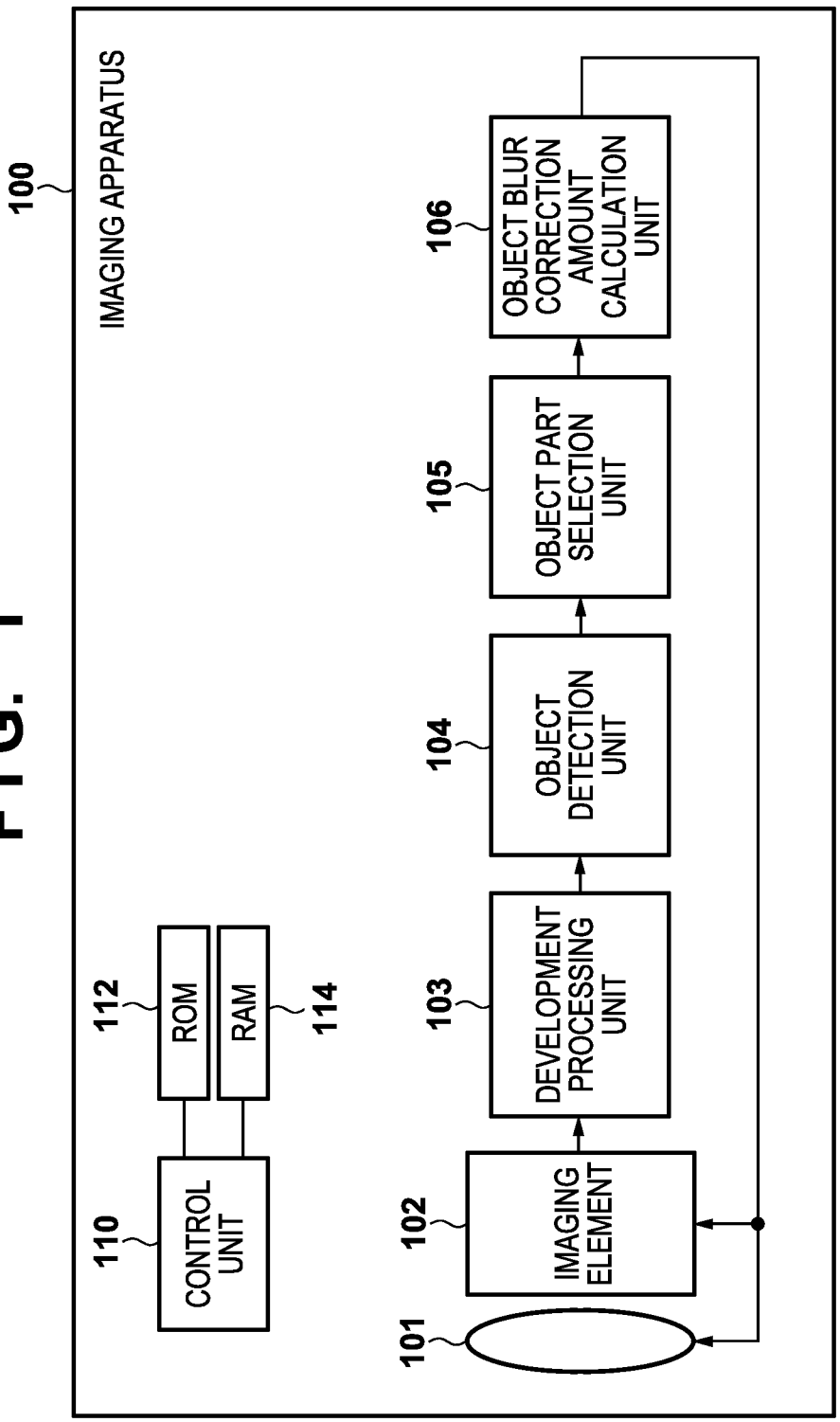
FIG. 1 is a block diagram illustrating a configuration of an imaging apparatus according to a first embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted. Each of the embodiments of the present invention described below can be implemented solely or as a combination of a plurality of the embodiments or features thereof where necessary or where the combination of elements or features from individual embodiments in a single embodiment is beneficial.

First Embodiment

<Description of Block Diagram>

FIG. 1 is a view illustrating the configuration of an imaging apparatus 100, which is the first embodiment of an image blur correction apparatus (image stabilization apparatus) of the present invention.

In FIG. 1, the imaging apparatus 100 includes an imaging optical system 101, an imaging element 102, a development processing unit 103, an object detection unit 104, an object part selection unit 105, an object blur correction amount calculation unit 106, a control unit 110, a ROM 112, and a RAM 114.

In the present embodiment, the imaging optical system 101 includes a correction lens that is displaced in a direction different from the optical axis of the imaging optical system 101 to move the object image on the imaging surface and correct image blur. The imaging element 102 is configured to be able to correct image blur by being displaced in a direction orthogonal to the optical axis.

In FIG. 1, the imaging apparatus 100 is illustrated as an imaging apparatus in which a lens and a camera body are integrated, but the present invention is also applicable to a lens-interchangeable imaging apparatus.

In FIG. 1, the object image formed by the imaging optical system 101 is converted into an analog image signal in the imaging element 102. The analog image signal is A/D converted in the development processing unit 103, then subjected to development processing such as white balance correction, color (luminance/color difference signal) conversion, and y correction, and output as image data.

The object detection unit 104 detects a specific object for each part with respect to the input image data from the development processing unit 103, and outputs the position of the part of the object having been detected. The part is, for example, a head, a face, a pupil, a nose, a mouth, a trunk, an arm, a leg, or the like.

The object part selection unit 105 selects a part of the object based on a predetermined priority from the one or more parts of the object detected by the object detection unit 104.

The object blur correction amount calculation unit 106 calculates the object blur correction amount based on a difference between the position of the part of the object selected by the object part selection unit 105 and a predetermined target position in the image.

Then, at least one of the correction lens and the imaging element 102 in the imaging optical system 101, which is an optical image blur correction means is displaced based on the object blur correction amount calculated by the object blur correction amount calculation unit 106. This makes it possible to perform optical image blur correction so that the position of a desired part of the object gets close to the target position.

The control unit 110 including a microcomputer or the like controls the entire imaging apparatus 100 by developing, in the RAM 114, a program stored in the ROM 112 and executing the program.

Not limited to optical image blur correction, the present invention may perform electronic image blur correction based on the object blur correction amount. The electronic image blur correction is operation of correcting image blur by changing, from the entire image region, a clip position of an image region for display smaller than the entire image region, based on the object blur correction amount.

<Description of Flowchart>

Next, image blur correction operation in the imaging apparatus 100 configured as described above will be described with reference to the flowchart illustrated in FIG. 2. The operation of the flowchart of FIG. 2 is achieved by the control unit 110 developing, in the RAM 114, and executing a program stored in the ROM 112.

Figure 2:
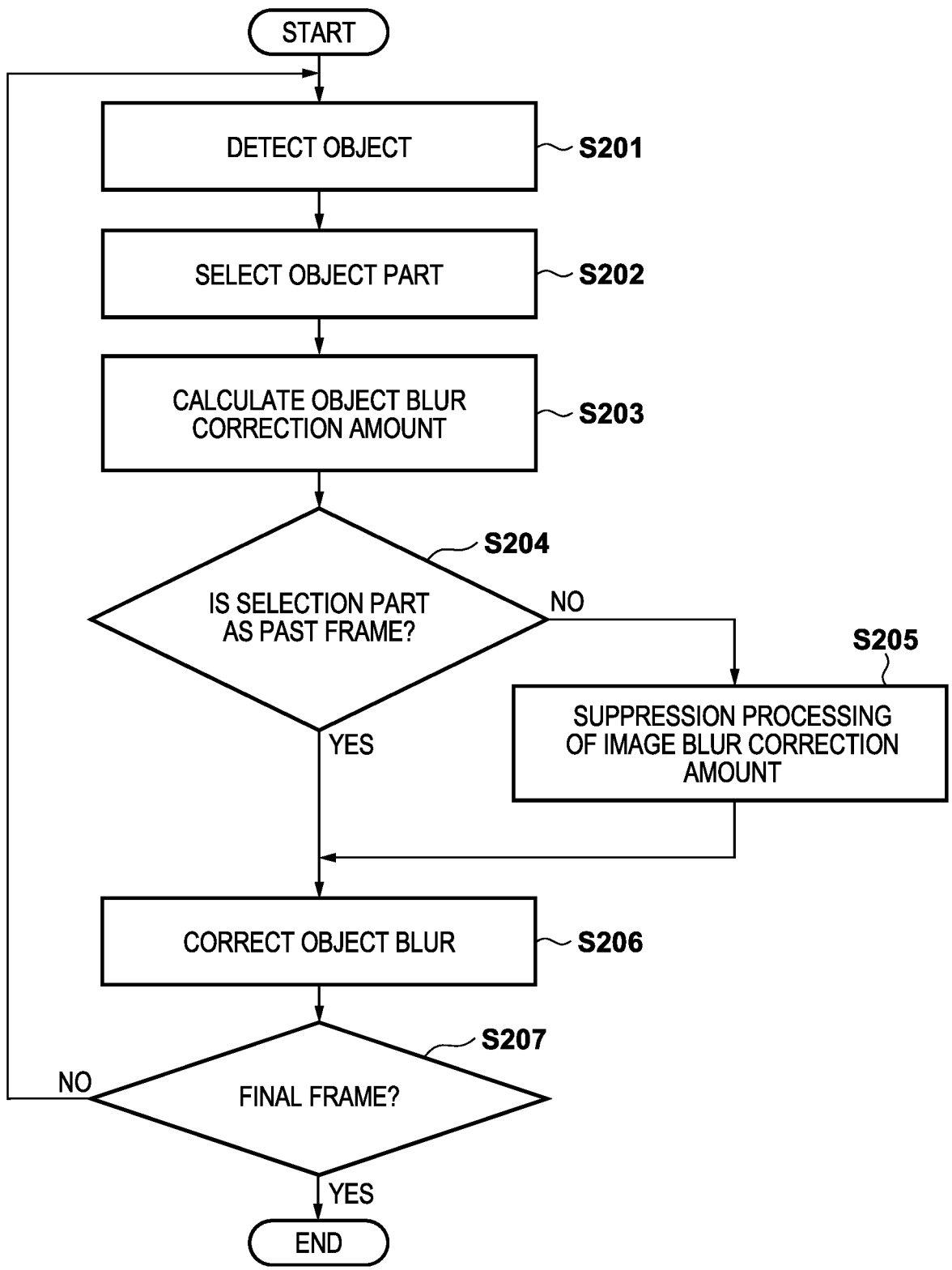
FIG. 2 is a flowchart describing processing performed in the first embodiment.

In FIG. 2, in step S201, the control unit 110 uses the object detection unit 104 to detect a specific object for each part from the input image from the development processing unit 103. A representative part of the object includes a face of a person.

In this case, a known face detection method is only required to be used as the detection method. The known methods of face detection include a method of using knowledge (skin color information and parts such as eyes, nose, and mouth) regarding a face, and a method of configuring a discriminator for face detection by a learning algorithm represented by a neural network. Then, in order to improve detection accuracy, it is common to perform face detection by combining them. Also in a case other than a face of a person, it is also possible to detect using a similar method.

Figure 3:
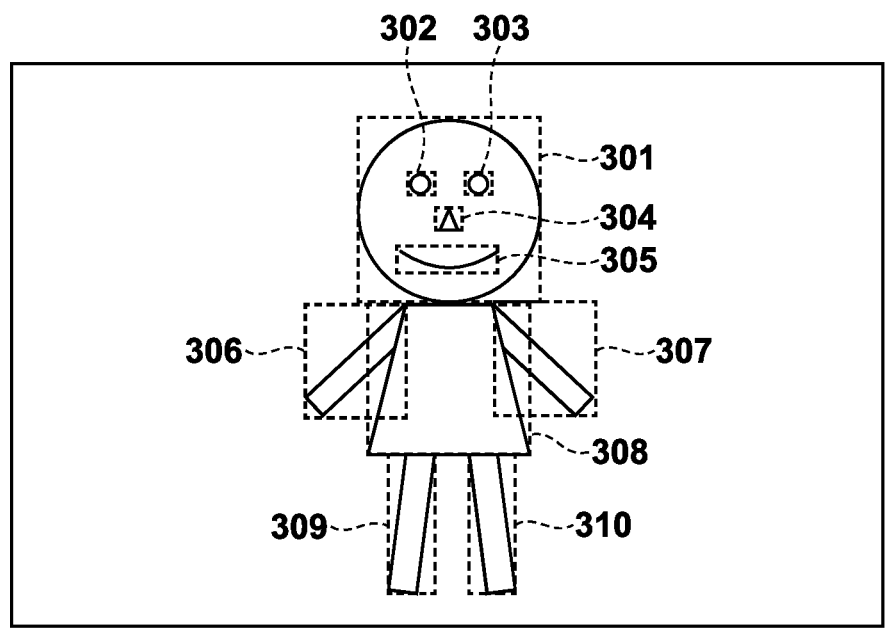
FIG. 3 is a view illustrating an example of an object detection result.

FIG. 3 is a view illustrating an example of an object detection result in a case where the object is a person. Rectangles 301 to 310 indicate detected parts. Specifically, the rectangle 301 represents a face or a head, the rectangle 302 represents a right eye, the rectangle 303 represents a left eye, the rectangle 304 represents a nose, the rectangle 305 represents a mouth, the rectangle 306 represents a right arm, the rectangle 307 represents a left arm, the rectangle 308 represents a trunk, the rectangle 309 represents a right leg, and the rectangle 310 represents a left leg.

Hereinafter, the representative point included in each rectangle is treated as the position of the part of the object. As the representative point, for example, barycentric coordinates that are coordinates of the barycenter of each rectangle are used. Here, the detected part is expressed by a rectangle for convenience, but is not limited to a rectangle, and may be expressed by a discretionary shape.

The type of the object is not limited to a person as in the example of FIG. 3, and may be, for example, an animal such as a dog, a cat, a bird, or a horse. The present invention can also be applied to general objects other than animals. For example, in the case of a vehicle, a part to be detected is only changed to a tire, a door, a hood, a trunk, or the like. Also the fineness of the detection part is not limited to the example of FIG. 3, and may be finer or coarse.

In a case where there are a plurality of objects in an image, it is assumed that one object considered to be the most main object is selected and a part of the object is output. Selection methods include, for example, a method of preferentially selecting one that is large in size, close in position to the center of the image, and high in detection reliability. Selection methods may also include a method allowing the user to select from a plurality of candidates. As described above, the position of the part of the object can be obtained.

In step S202, the control unit 110 uses the object part selection unit 105 to select a part of the object based on a predetermined priority from among the one or more parts of the object detected in step S201.

As the predetermined priority, for example, in a case where the object detection result is used for autofocus (AF), it is common to set the priority of fine organs such as eyes and pupils to be higher than that of the face.

On the other hand, in a case where the object detection result is used for the object blur correction of the present embodiment, it is necessary to set the priority also in consideration of viewpoints such as detection stability, shape stability, and position stability.

The detection stability represents how stable the part can be detected. For example, in the case of the eye, since the eye is smaller than the head or the trunk and is more difficult to detect, the detection stability is low.

The shape stability represents how stable the shape of the part is. For example, since the shape of human arms, legs, bird wings, and the like change due to expansion and contraction, the shape stability is low. In the case of the eye, the shape changes depending on the degree of opening although the change is not as large as that of the arm or the leg. It can be said that the head is higher in shape stability than the arms, legs, and eyes.

The position stability represents how stable the position of the part of the object is when the object changes its orientation. For example, in the case of the eye, when the orientation of the object changes as the front, the side, and the back, the position of the part of the object also changes, and thus the position stability is low. On the other hand, in the case of the head, even if the orientation of the object changes as the front, the side, and the back, the position of the part of the object does not greatly change, and it can be said that the position stability is high.

In order to stably perform the object blur correction, it is desirable that these stabilities be high. Thus, since the viewpoint of priority is different from that in the case of AF, it is preferable to be able to select the part of the object used for the object blur correction independently of the part of the object used for AF.

Specifically, it is preferable to preferentially select the face or the head rather than organs included in the face such as the eyes, the nose, and the mouth as the part of the object. From the viewpoint of video, since attention is generally focused on the face or the head rather than the trunk, it is preferable to correct blur of the face or the head more preferentially than the trunk as a part of the object.

In step S203, the control unit 110 uses the object blur correction amount calculation unit 106 to calculate the object blur correction amount based on the difference between the position of the part of the object selected in step S202 and a predetermined target position in the image. A calculation method of the object blur correction amount will be described with reference to FIG. 4.

Figure 4:
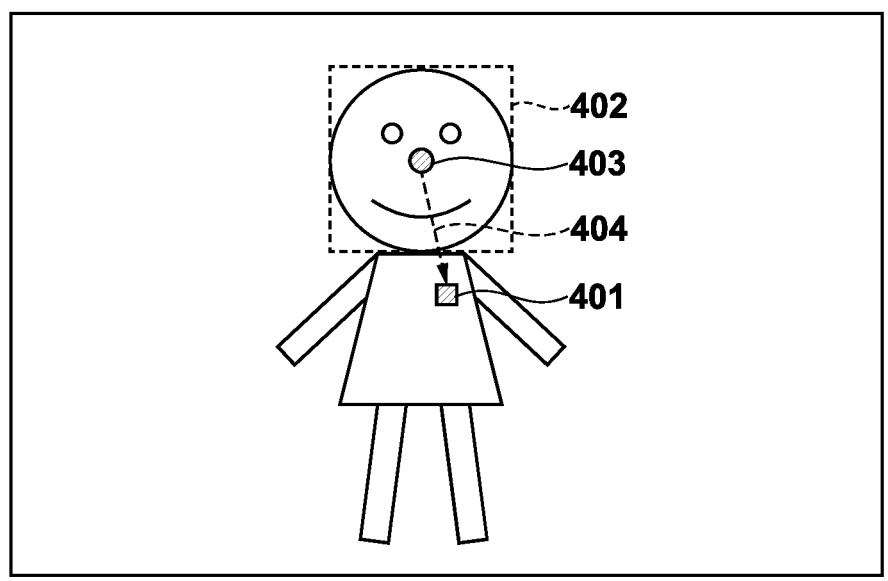
FIG. 4 is a view describing a calculation method of an object blur correction amount.

A black square 401 indicates a predetermined target position in the image and can be set at a discretionary shape. In the example of FIG. 4, the target position is set in the center of the image. A rectangle 402 indicated by a dotted line indicates the head selected in step S202, and a black circle 403 indicates its barycentric position. An arrow 404 indicates a difference between the coordinates 401 and the coordinates 403, and this difference is set as the object blur correction amount.

The position of the part of the object to be detected generally has an error due to influences of noise of the image and the accuracy of the object detection. Therefore, it is desirable that a low-pass filter (LPF) is applied to the position of the part of the object to be detected or the object blur correction amount, and a low-frequency component is used as the object blur correction amount.

In step S204, the control unit 110 determines whether or not the part of the object selected in step S202 is the same as the part selected in the immediately previous frame. The control unit 110 advances the processing to step S205 in a case where the part is different from the part selected in the immediately previous frame, and advances the processing to step S206 in a case where the parts are the same.

Figure 5A:
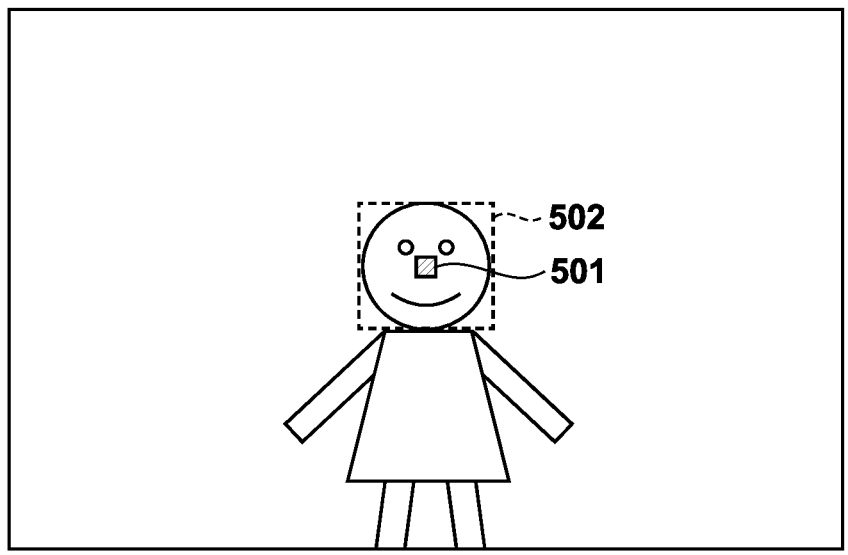
FIGS. 5A to 5C are views describing an example of a case where a part to be selected in object detection is switched.
Figure 5B:
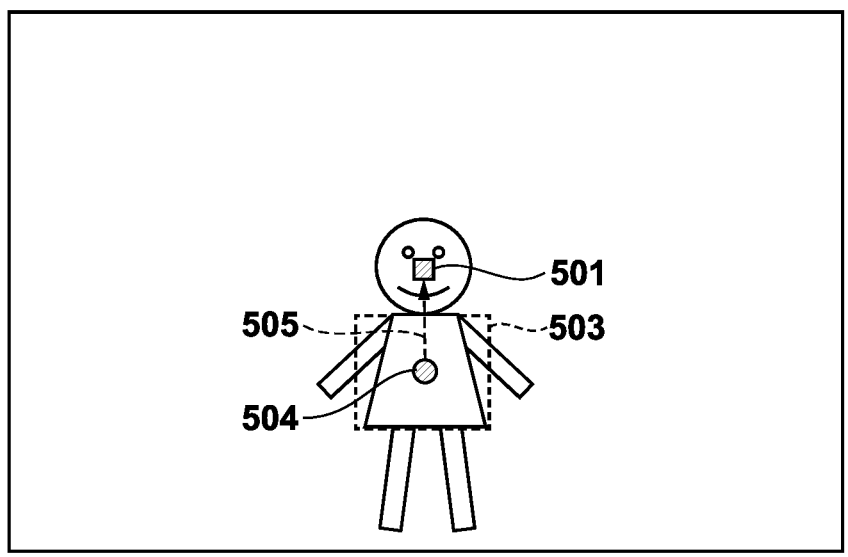
Figure 5C:
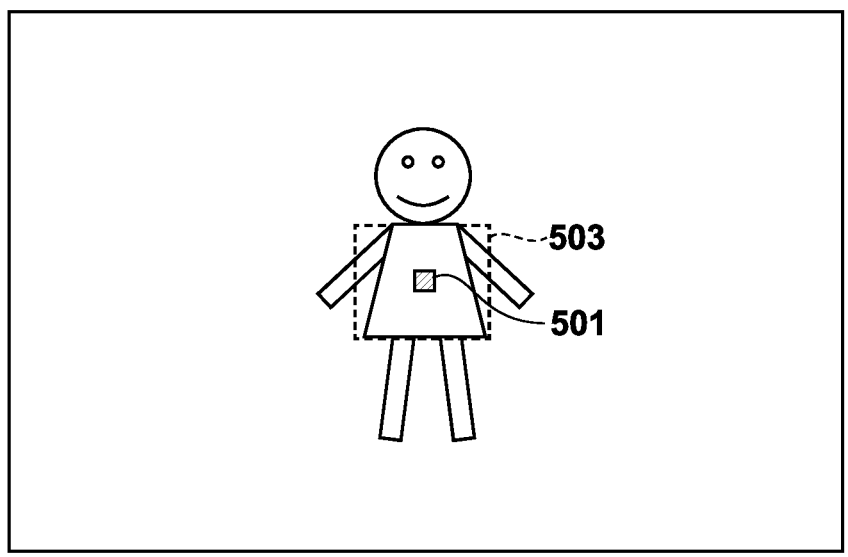

FIGS. 5A to 5C are views illustrating an example in which a selected part is different from that in the immediately previous frame. FIG. 5A illustrates a immediately previous frame, FIG. 5B illustrates a current frame, and FIG. 5C illustrates a next frame. In contrast to FIG. 5A, FIGS. 5B and 5C illustrate a state in which the object moves away and becomes smaller. A black square 501 indicates the target position of the object, which is the center of the image in this example.

In FIG. 5A, a head 502 of the object is selected, and in FIGS. 5B and 5C, a trunk 503 is selected. As described in step S202, when the head can be detected in FIGS. 5B and 5C, the head is preferentially selected. However, in FIGS. 5B and 5C, since the head is too small to detect, and only the trunk is detected, the trunk is selected.

In FIG. 5A, the object blur correction is performed such that the barycentric coordinates of the head 502 overlap the target position 501.

In FIG. 5B, a trunk 505 is selected as the part. At the time when FIG. 5B is acquired, object blur correction is performed so that the barycentric coordinates of the head 501 still overlap the target position 501. A black circle 504 indicates the barycentric coordinates of the trunk, and an arrow 505 indicates the object blur correction amount for moving the barycentric coordinates of the trunk to the target position 501.

FIG. 5C illustrates a frame acquired as a result of the object blur correction performed according to the arrow 505 (object blur correction amount) such that the barycentric coordinates 504 of the trunk overlap the target position 501 (image center). That is, with the switching of the part of the object to be detected, the state in which the head of the object is near the target position 501 that is the center of the image (FIGS. 5A and 5B) changes to a state in which the trunk of the object is at the center of the image. That is, although the position of the object on the image is substantially the same in FIGS. 5A and 5B, the part of the object to be detected is switched, and the object blur is corrected using the barycentric coordinates of the trunk in FIG. 5B, so that the position of the object moves unnaturally by the amount of change in the barycentric coordinates of the part of the object.

Therefore, in order to suppress the position of the object from unnaturally moving due to switching of the part of the object, in a case where the part selected in step S202 is changed, suppression processing of the object blur correction amount presented in the next step S205 is performed.

In step S205, the control unit 110 uses the object blur correction amount calculation unit 106 to suppress the object blur correction amount calculated in step S203 based on the displacement amount of the position of the part when the part of the object selected by the object part selection unit 105 is switched.

Specifically, a value obtained by subtracting the barycentric coordinates of the head 502 in FIG. 5A from the barycentric coordinates of the trunk 503 in FIG. 5B is subtracted as an offset from the object blur correction amount 505. In this way, the change amount in the barycentric coordinates of the part of the object is canceled from the object blur correction amount, and unnatural movement of the position of the object is eliminated.

Figure 6:
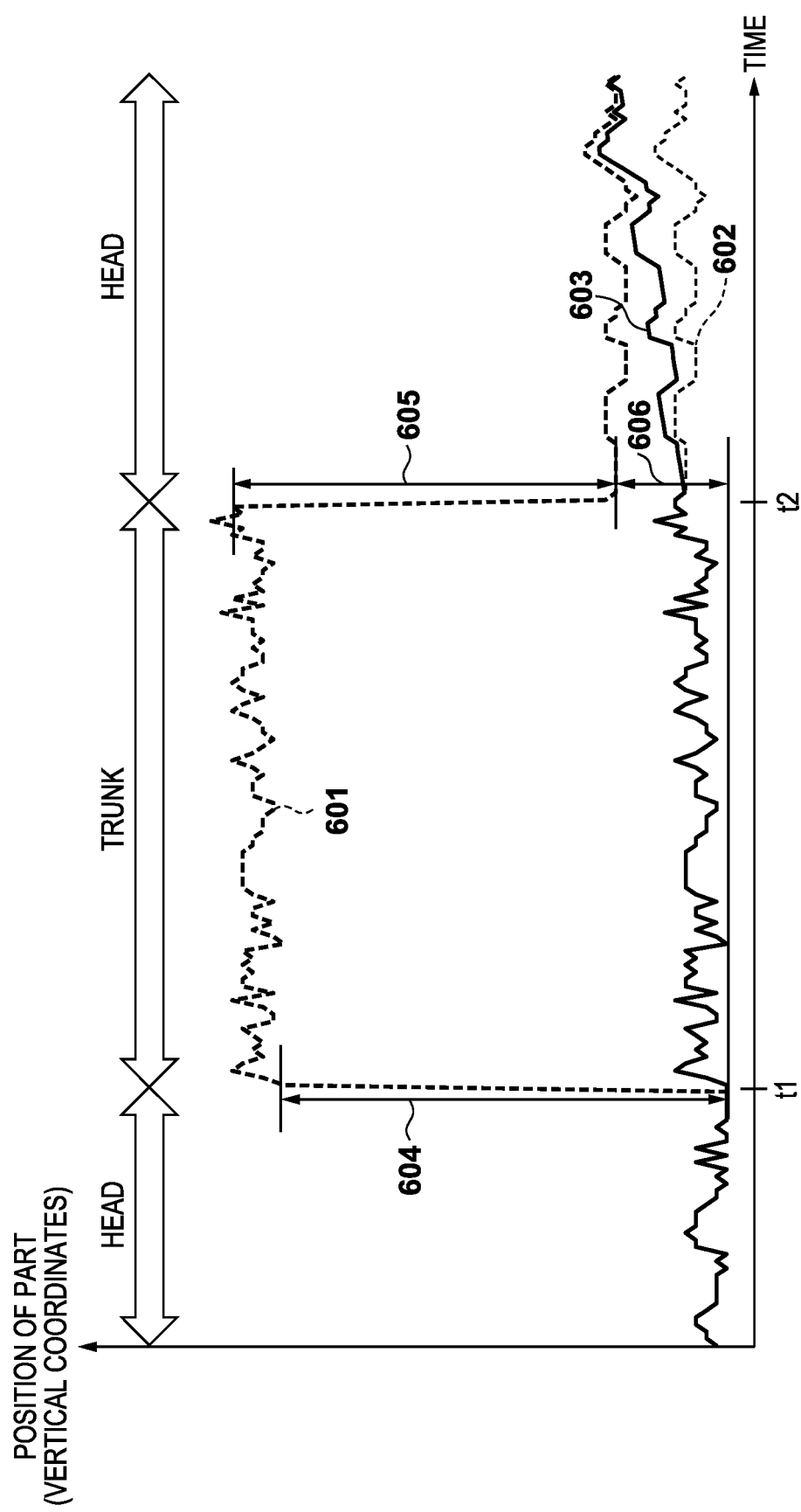
FIG. 6 is a view describing suppression processing of object blur correction.

The suppression processing of the object blur correction amount will be described in detail with reference to FIG. 6. In FIG. 6, the horizontal axis represents time, and the vertical axis represents vertical coordinates of the position of the part of the object selected in step S202. In this example, it is assumed that the head, which is the part with the highest priority, is initially selected, and switched from the head to the trunk at time t1, and switched from the trunk to the head again at t2.

In FIG. 6, a broken line 601 represents time-series data of the position of the part of the object before the suppression processing, and a dotted line 602 represents time-series data of the position of the part of the object after the suppression processing. A solid line 603 indicates time-series data obtained by performing correction processing described later on the dotted line 602. Here, in FIGS. 5A to 5C, the downward direction of the image is defined as a direction in which the vertical coordinates increase. Since the head is present higher than the trunk in FIGS. 5A to 5C, the vertical coordinates is small at the head and the vertical coordinates is large at the trunk in FIG. 6.

At times t1 and t2, the vertical coordinates are largely displaced due to the switching of the part. Let the displacement amount of the position of the part of the object at t1 be 604, and the displacement amount of the position of the part of the object at t2 be 605. If these displacement amounts are reflected in the correction amount of the object blur as is, the position of the object changes unnaturally just by a change in the part to be selected.

Therefore, from the position 601 of the part of the object before the suppression processing, the displacement amount 604 is subtracted as an offset at and after time t1, and the displacement amount 606, which is an amount obtained by adding the displacement amount 604 and the displacement amount 605, is subtracted as an offset at and after time t2, whereby the position 602 of the part of the object after the suppression processing can be obtained.

As described above, the object blur correction amount calculation unit 106 subtracts, from the object blur correction amount, as an offset, the displacement amount of the position of the part when the part of the object selected by the object part selection unit 105 is switched. Furthermore, the object blur correction amount calculation unit 106 further adds an offset to the current offset and subtracts the added offset from the object blur correction amount each time the part of the object selected by the object part selection unit 105 is switched. This makes it possible to suppress the position of the object from unnaturally moving due to switching of the part of the object.

Here, since the head is selected again at and after time t2, the dotted line 602 after the suppression processing ideally coincides with the broken line 601 before the suppression processing, but does not coincide with the broken line. This is because the offset at time t1 and the offset at time t2 are not offset, and an offset error occurs. As a cause of the offset error, a motion of the object when the part of the object is switched, an error in object detection, and the like are considered.

Then, at and after time t2 at which the head is detected again, by gradually bringing the added offset (displacement amount 604+605=displacement amount 606) close to zero, the dotted line 602 after the suppression processing approaches the broken line 601 before the suppression processing, and the solid line 603 can be obtained.

That is, when a part of the object with the highest priority is selected by the object part selection unit 105, the object blur correction amount calculation unit 106 can correct the deviation of the object blur correction amount due to the offset by gradually bringing the added offset close to zero.

In step S206, the control unit 110 performs image blur correction based on the object blur correction amount calculated in step S203 or step S205. As mentioned earlier, the correction lens in the imaging optical system 101, which is an optical image blur correction means, the imaging element 102, and the electronic image blur correction unit (not illustrated) can be used as the image blur correction means.

In final step S207, the control unit 110 determines whether or not the processing has been completed up to the final frame, and in a case where the processing has not been completed up to the final frame, returns the processing to step S201. In the case where the processing is completed up to the final frame, the operation of this flow is ended.

By the above processing, even in a case where the part of the object to be detected is switched, the object blur correction can be performed without impairing the quality of video.

All the processing of steps S201 to S207 can be performed in real time during imaging, but it is not necessarily performed during imaging, and may be performed during reproducing an image.

For example, an image during imaging is recorded in a recording unit not illustrated, and the processing of steps S201 to S207 is performed on the image recorded by the electronic image blur correction, whereby the object blur correction can be performed during reproducing the image.

During imaging, in addition to the image, information on the position of the part of the object obtained by the object detection unit 104 may be recorded, and object detection needs not be performed during reproducing the image.

Modification of First Embodiment

In the suppression processing of the object blur correction amount in the above-described embodiment, a value obtained by subtracting the barycentric coordinates of the head 502 in FIG. 5A before the part of the object selected is switched from the barycentric coordinates of the trunk 503 in FIG. 5B after the part of the object selected is switched is subtracted as an offset from the object blur correction amount 505. However, the calculation method of the offset is not limited to this.

As the offset, it is preferable to use a difference between the barycentric coordinates of the head after the part of the object selected is switched and the barycentric coordinates of the trunk after the part of the object selected is switched, but the barycentric coordinates of the head after the switching are not known. Therefore, in the above-described embodiment, the change in the barycentric coordinates of the head before and after switching is regarded to be small, and in the above-described embodiment, a value obtained by subtracting the barycentric coordinates of the head 502 before switching from the barycentric coordinates of the trunk 503 after switching is used as the offset. However, in a case where the barycentric coordinates of the head 502 before switching are deviated from the target position, the deviation becomes a target of object blur correction, and the barycentric coordinates of the head 502 change by the object blur correction amount even if the object does not move. Therefore, the object blur correction amount corrected before and after switching may be further added to a value (the above-described displacement amount 604) obtained by subtracting the barycentric coordinates of the head 502 before switching from the barycentric coordinates of the trunk 503 after switching. However, since the object blur correction is executed at the time point of FIG. 5A before switching, and the deviation between the target position and the barycentric coordinates of the head 502 is regarded to be small, as described above, a value obtained by subtracting the barycentric coordinates of the head 502 before switching from the barycentric coordinates of the trunk 503 after switching may be used as the offset.

In a case where the trunk 503 can be detected before the part of the object selected is switched, a value obtained by subtracting the barycentric coordinates of the head 502 from the barycentric coordinates of the trunk 503 in FIG. 5A before the part of the object selected is switched can also be used as the offset. As described above, when the size of the object varies between FIGS. 5A and 5B, when the offset is obtained from the barycentric coordinates of the head 502 before switching and the barycentric coordinates of the trunk 503, the offset also includes an error by the variation amount in the size of the object. However, variation in the size of the object occurring in a short time before and after the switching is not large. Therefore, the offset may be obtained from the barycentric coordinates of the head 502 before switching and the barycentric coordinates of the trunk 503. In order to obtain the offset more accurately, the size of the trunk before switching and the size of the trunk after switching may be compared to obtain the variation in the size of the object occurring before and after switching, and the offset may be obtained in consideration of this.

Second Embodiment

In the first embodiment, only the object blur is treated as the target of image blur correction, but in the present embodiment, the image blur correction is performed also in consideration of camera shake.

Figure 7:
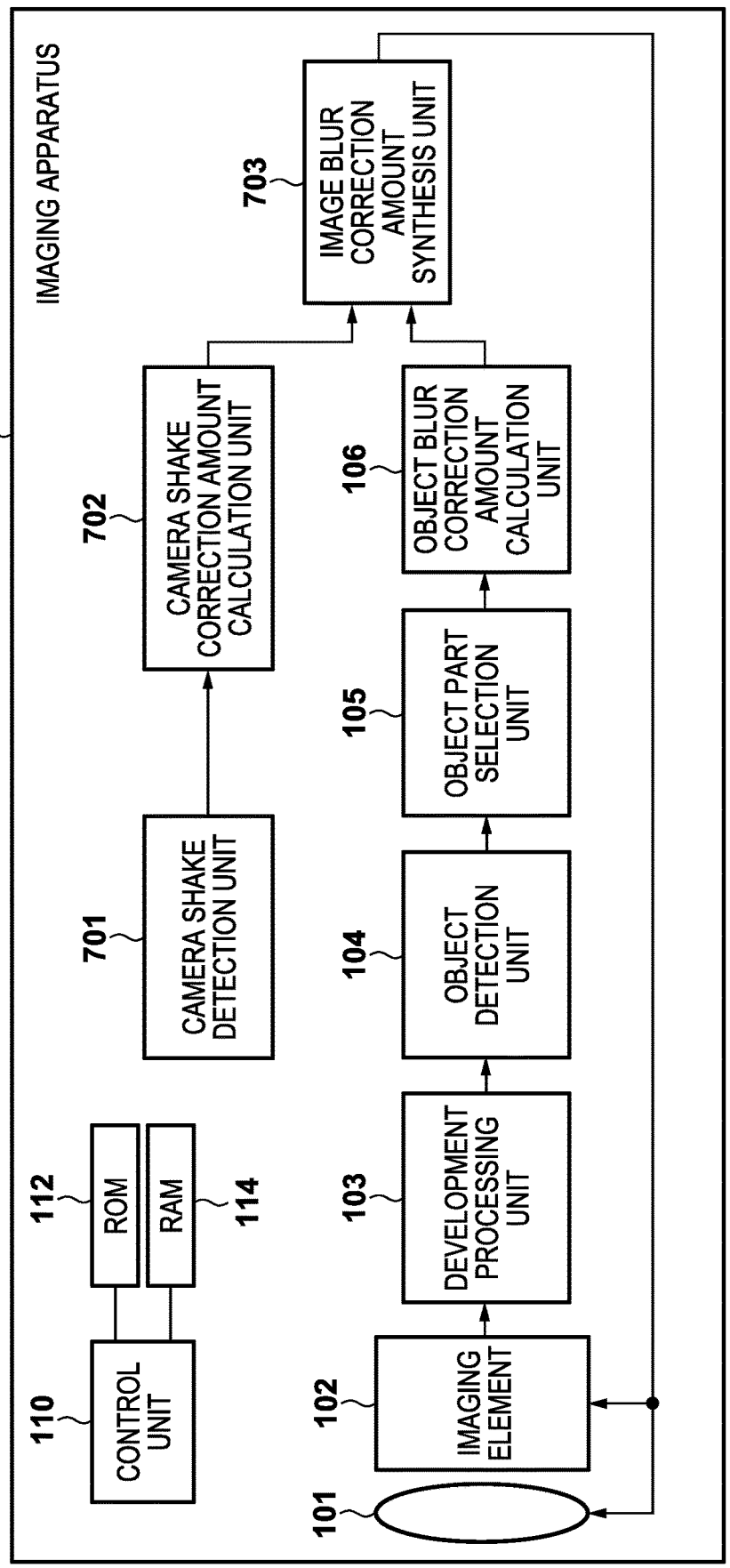
FIG. 7 is a block diagram illustrating a configuration of an imaging apparatus according to a second embodiment.

FIG. 7 is a view illustrating the configuration of an imaging apparatus 700 according to the second embodiment of the present invention. In FIG. 7, parts common to the components illustrated in FIG. 1 are denoted by the same reference numerals as those in FIG. 1, and description is omitted. The imaging apparatus of the present embodiment includes a camera shake detection unit 701, a camera shake correction amount calculation unit 702, and an image blur correction amount synthesis unit 703 in addition to the configuration illustrated in FIG. 1. In the present embodiment, only parts that perform processing different from that of the first embodiment will be described.

The camera shake detection unit 701 detects camera shake applied to the imaging apparatus 700. The camera shake correction amount calculation unit 702 calculates an image blur correction amount (camera shake correction amount) for correcting image blur caused by shake detected by the camera shake detection unit 701.

The image blur correction amount synthesis unit 703 generates a final image blur correction amount (synthesis image blur correction amount) by synthesizing the object blur correction amount output from the object blur correction amount calculation unit 106 and the image blur correction amount (camera shake correction amount) output from the camera shake correction amount calculation unit 702.

Figure 8:
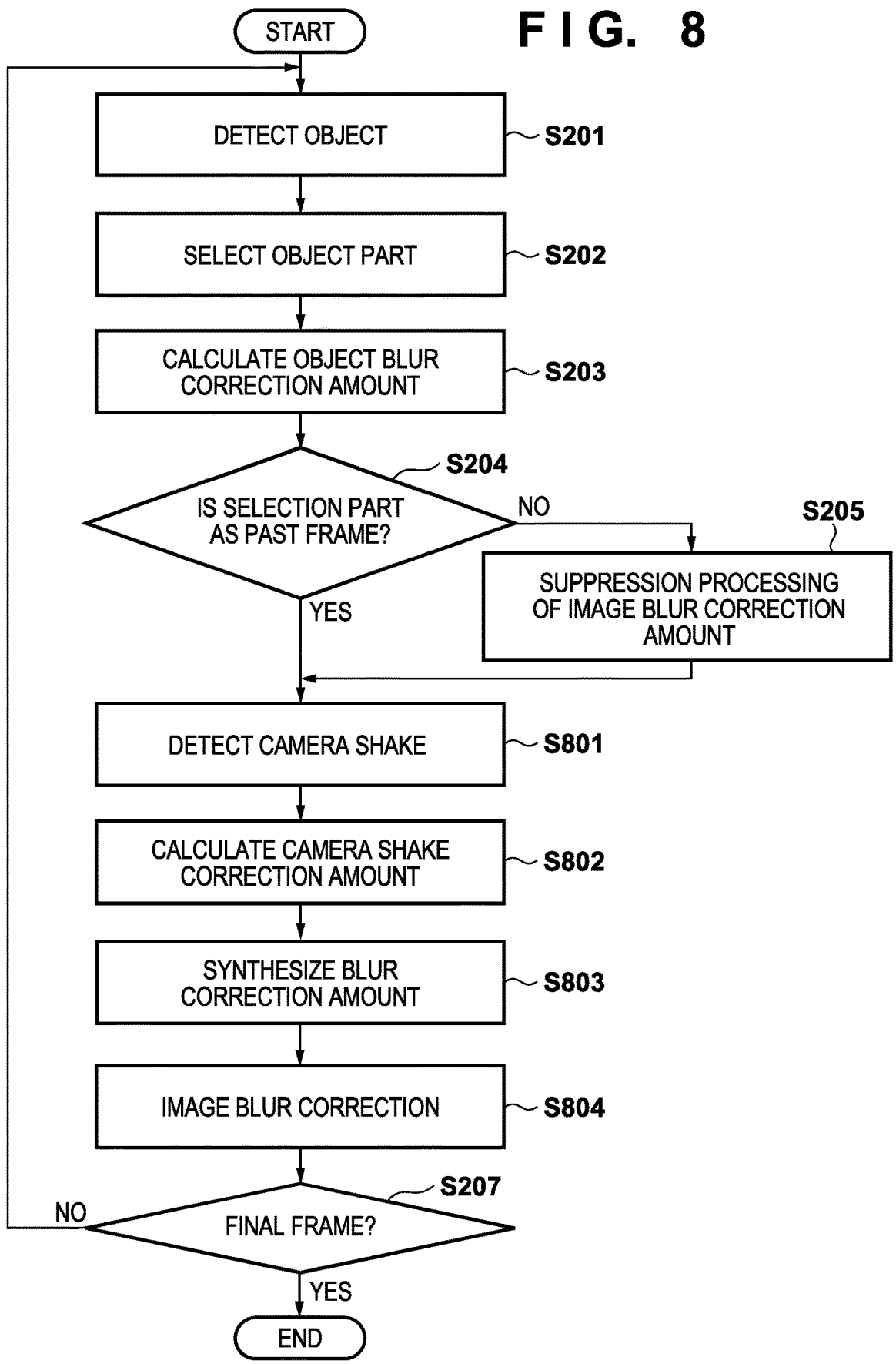
FIG. 8 is a flowchart describing processing performed in the second embodiment.

FIG. 8 is a flowchart presenting image blur correction operation in the second embodiment. In FIG. 8, steps common to the steps illustrated in FIG. 2 are denoted by the same reference numerals as those in FIG. 2, and description is omitted. The operation of the flowchart of FIG. 8 is achieved by the control unit 110 developing, in the RAM 114, and executing a program stored in the ROM 112.

In step S204, the control unit 110 determines whether or not the part of the object selected in step S202 is the same as the part selected in the immediately previous frame. The control unit 110 advances the processing to step S205 in a case where the part is different from the part selected in the immediately previous frame, and advances the processing to step S801 in a case where the parts are the same. After completion of step S205, the control unit 110 advances the processing to step S801.

In step S801, the control unit 110 uses the camera shake detection unit 701 to detect camera shake applied to the imaging apparatus 700. For example, a gyro sensor can be used as the camera shake detection unit 701. However, the detection method is not limited to this. The timing of executing step S801 is discretionary as long as it is before S802, and may be before or after S201 to S205.

In step S802, the camera shake correction amount calculation unit 702 calculates a camera shake correction amount for correcting image blur caused by the camera shake detected in step S801. For example, the camera shake correction amount can be calculated by integrating the angular velocity signal of the camera shake obtained by the gyro sensor and inverting the sign.

In step S803, using the image blur correction amount synthesis unit 703, the control unit 110 synthesizes the object blur correction amount obtained in step S204 or step S205 and the camera shake correction amount obtained in step S802 to calculate a final image blur correction amount.

Synthesis methods include, for example, a method of performing synthesis separately by frequency. Specifically, a low-pass filter (LPF) is applied to the object blur correction amount to extract a low-frequency component. On the other hand, a high-pass filter (HPF) is applied to the camera shake correction amount to extract a high-frequency component. The low-frequency component of the object blur correction amount thus obtained and the high-frequency component of the camera shake correction amount are added and synthesized.

That is, the final image blur correction amount becomes an image blur correction amount that corrects the object blur component at the low frequency and corrects the camera shake component at the high frequency.

Here, it is preferable that the cutoff frequencies of the LPF and the HPF are made to substantially coincide and are dynamically changed according to the reliability of object detection. For example, when the reliability of object detection is high, the object blur correction is strengthened by increasing the cutoff frequency, and when the reliability of object detection is low, the camera shake correction is strengthened by decreasing the cutoff frequency.

In step S804, the control unit 110 performs image blur correction based on the final image blur correction amount obtained in step S803. As mentioned earlier, the correction lens in the imaging optical system 101, which is an optical image blur correction means, the imaging element 102, and the electronic image blur correction unit (not illustrated) can be used as the blur correction means.

By the above processing, even in a case where the part of the object to be detected is switched, the object blur correction and the image blur correction due to camera shake can be performed without impairing the quality of video.

Third Embodiment

In both the first embodiment and the second embodiment, a mode has been described in which the offset is acquired along with switching of the object part and the acquired offset is subtracted from the object blur correction amount. The same effects as those described above can also be obtained by changing the target position according to the switching of the object part. In the present embodiment, a mode in which the target position is changed according to the switching of the object part will be described.

The present embodiment is different from the first embodiment in the suppression processing of the object blur correction amount presented in step S205, but the other configurations are the same as those of the first embodiment, and therefore the description will be omitted. In the present embodiment, the target position is changed as the suppression processing. The target position is determined based on the position of the object part selected after the switching. The part of the object selected after the switching refers to the trunk 503 in the cases of FIGS. 5A and 5B. Hereinafter, for the sake of description, an object part (in the case of FIGS. 5A and 5B, the head part 502) selected before the switching occurs may be referred to as first part, and an object part (in the case of FIGS. 5A and 5B, the trunk 503) selected after the switching occurs may be referred to as second part.

The target position after change will be described. In the present embodiment, for example, the object blur correction amount after switching is calculated using, as the target position, the barycentric coordinates (the position of the black circle 504) of the second part (the trunk 503) in the frame after switching illustrated in FIG. 5B. Since FIG. 5B is an image of a frame obtained as a result of the object blur correction using the barycentric coordinates of the first part (head 502), the head 502 is positioned in the vicinity of the center of the image that is the original target position 501. Therefore, by setting the barycentric coordinates of the trunk 503 in FIG. 5B as the target position and performing the object blur correction such that the barycentric coordinates of the trunk 503 are at the target position (that is, barycentric coordinates of the trunk 503 in FIG. 5B) in the subsequent frames, the object blur correction control can be performed such that the head 502 is positioned in the vicinity of the center of the image even if the head 502 is not selected. This makes it possible to reduce a sudden change in the object position accompanying the switching of the object part.

The barycentric coordinates of the second part (trunk 503) in the frame before switching illustrated in FIG. 5A may be set as the target position. In this case, similarly to the modification of the first embodiment, it is affected by the variation in size of the object occurring between FIGS. 5A and 5B. However, since it can be regarded that the variation in size of the object occurring in a short time is not large, there is a small possibility that a large variation in composition occurs even when the barycentric position of the trunk 503 in the frame before switching is set as the target position.

The target position may be set based on a difference in barycentric coordinates between the first part (head 502) and the second part (trunk 503) in the frame before switching illustrated in FIG. 5A. In a case where the head 502 deviates from the target position in the frame before switching, if the position of the trunk 503 in the frame before switching is set as the target position as it is, the object blur correction is performed so that the deviated state is maintained. The position obtained by adding the difference between the head 502 and the trunk 503 in the frame before switching to the target position (the center of the image in FIG. 5A) before switching is set as the target position, whereby the position of the trunk 503 when the head 502 is positioned at the center of the image can be set as the target position. However, similarly to the case where the barycentric coordinates of the trunk 503 in the frame before switching are set as the target position, it is affected by the variation in size of the object occurring between FIGS. 5A and 5B.

Even in a case of use of the position of the second part (trunk 503) of any of before and after the switching, various adjustments may be performed in addition to setting the barycentric coordinates of the trunk as the target position as is. For example, in a case where the object rapidly moves at the same time as the switching of the object part, there is a possibility that the barycentric coordinates of the selected object part are positioned at the end of the image. In this case, when the barycentric coordinates themselves are set as the target position, object blur correction control is performed such that the object is positioned at the end of the image. Therefore, a position closer to the center of the image than the barycentric coordinates may be set as the target position by providing an upper limit value in the distance from the center of the image to the target position or limiting the coordinates that can be set as the target position. In a case where the size of the second part before and after the switching can be detected, a position for which the barycentric coordinates of the second part before the switching is adjusted in consideration of the variation in size may be set as the target position. For example, in a case where the object part is switched from the face to the trunk due to the decrease in size of the object, a position where the barycentric coordinates of the trunk before switching are brought to the center by the amount corresponding to the variation in size may be set as the target position.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-004591, filed Jan. 14, 2022, and Japanese Patent Application No. 2022-197365 filed Dec. 9, 2022, which are hereby incorporated by reference herein in their entirety.

What is claimed is:

1. An image blur correction apparatus comprising:
at least one processor or circuit configured to function as:
an object detection unit configured to detect an object for each part from an input image and output a position of the part of the object detected;
a selection unit configured to select a part of an object from among parts of one or more objects detected by the object detection unit; and
an object blur correction amount calculation unit configured to calculate an object blur correction amount for correcting object blur based on a difference between a position of a part of an object selected by the selection unit and a predetermined target position in an image,
wherein the object blur correction amount calculation unit, when a part of an object selected by the selection unit is switched from a first part to a second part, calculates the object blur correction amount based on a position of the second part in an image, a position of the first part in an image acquired before switching, and a difference between a position of the selected part of the object and the predetermined target position, wherein the selected part is the first part or the second part.

2. The image blur correction apparatus according to claim 1, wherein when a part of an object selected by the selection unit is switched from a first part to a second part, the object blur correction amount calculation unit calculates the object blur correction amount based on a difference between a position of the selected part of the object and the target position, and a position of the first part in an image acquired before switching and a position of the second part after switching.

3. The image blur correction apparatus according to claim 2, wherein when a part of an object selected by the selection unit is switched from a first part to a second part, the object blur correction amount calculation unit calculates the object blur correction amount based on a difference between a position of the selected part of the object and the target position, and a difference between a position of the first part in an image acquired before switching and a position of the second part in an image acquired after switching.

4. The image blur correction apparatus according to claim 1, wherein when a part of an object selected by the selection unit is switched from a first part to a second part, the object blur correction amount calculation unit calculates the object blur correction amount based on a difference between a position of the selected part of the object and the target position, and a position of the first part in an image acquired before switching and a position of the second part in an image acquired before switching.

5. The image blur correction apparatus according to claim 4, wherein when a part of an object selected by the selection unit is switched from a first part to a second part, the object blur correction amount calculation unit calculates the object blur correction amount based on a difference between a position of the selected part of the object and the target position, and a difference between a position of the first part in an image acquired before switching and a position of the second part in an image acquired before switching.

6. The image blur correction apparatus according to claim 3, wherein the object blur correction amount calculation unit calculates the object blur correction amount by subtracting, as an offset, a difference between a position of the first part and a position of the second part from a provisional object blur correction amount based on a difference between a position of the second part and the target position.

7. The image blur correction apparatus according to claim 6, wherein the object blur correction amount calculation unit adds the offset each time a part of an object selected is switched, and subtracts an added offset from the provisional object blur correction amount.

8. The image blur correction apparatus according to claim 7, wherein the object blur correction amount calculation unit gradually brings the added offset close to zero in a case where a part of an object with highest priority is selected.

9. The image blur correction apparatus according to claim 1, wherein the at least one processor or circuit is configured to further function as a camera shake correction amount calculation unit configured to calculate a camera shake correction amount for correcting image blur due to shake applied to an imaging apparatus; and a synthesis unit configured to generate a synthesis image blur correction amount by synthesizing the object blur correction amount and a camera shake correction amount calculated by the camera shake correction amount calculation unit.

10. The image blur correction apparatus according to claim 9, wherein the synthesis unit adds and synthesizes a low-frequency component of the object blur correction amount and a high-frequency component of the camera shake correction amount.

11. The image blur correction apparatus according to claim 1, wherein the selection unit can select a part of an object used for correction of object blur independently of a part of an object used for autofocus.

12. The image blur correction apparatus according to claim 1, wherein the selection unit preferentially selects, as a part of an object, a face or a head rather than an organ included in a face.

13. The image blur correction apparatus according to claim 1, wherein the selection unit preferentially selects, as a part of an object, a face or a head rather than a trunk.

14. The image blur correction apparatus according to claim 1, further comprising an image blur correction device configured to correct image blur based on the object blur correction amount.

15. A control method for an image blur correction apparatus, the method comprising:
- detecting an object for each part from an input image and outputting a position of the part of the object detected;
- selecting a part of an object from among parts of one or more objects detected in the detecting; and
- calculating an object blur correction amount for correcting object blur based on a difference between a position of a part of an object selected in the selecting and a predetermined target position in an image,
- wherein when a part of an object selected in the selecting is switched from a first part to a second part, in the calculating, the object blur correction amount is calculated based on a position of the second part in an image, a position of the first part in an image acquired before switching, a difference between a position of the selected part of the object and the target position, wherein the selected part is the first part or the second part.

16. A non-transitory computer-readable storage medium storing a program for causing a computer to execute each process of a control method for an image blur correction apparatus, the method comprising:
- detecting an object for each part from an input image and outputting a position of the part of the object detected;
- selecting a part of an object from among parts of one or more objects detected in the detecting; and
- calculating an object blur correction amount for correcting object blur based on a difference between a position of a part of an object selected in the selecting and a predetermined target position in an image,
- wherein when a part of an object selected in the selecting is switched from a first part to a second part, in the calculating, the object blur correction amount is calculated based on a position of the second part in an image, a position of the first part in an image acquired before switching, a difference between a position of the selected part of the object and the target position, wherein the selected part is the first part or the second part.

* * * * *